United States Patent
Park et al.

(10) Patent No.: US 10,719,262 B2
(45) Date of Patent: Jul. 21, 2020

(54) DATA STORAGE APPARATUS, OPERATING METHOD THEREOF, AND STORAGE SYSTEM HAVING THE SAME

(71) Applicant: SK hynix Inc., Gyeonggi-do (KR)

(72) Inventors: Jeen Park, Gyeonggi-do (KR); Jung Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/217,575

(22) Filed: Dec. 12, 2018

(65) Prior Publication Data
US 2020/0065024 A1 Feb. 27, 2020

(30) Foreign Application Priority Data
Aug. 23, 2018 (KR) .................... 10-2018-0098485

(51) Int. Cl.
*G06F 3/06* (2006.01)
(52) U.S. Cl.
CPC .......... *G06F 3/0655* (2013.01); *G06F 3/0604* (2013.01); *G06F 3/0674* (2013.01); *G06F 3/0679* (2013.01)
(58) Field of Classification Search
CPC ............................ G06F 3/0659; G06F 12/0246
See application file for complete search history.

(56) References Cited

U.S. PATENT DOCUMENTS

| | | | | |
|---|---|---|---|---|
| 2015/0220275 A1* | 8/2015 | Oh | ........................ | G06F 3/0679 711/103 |
| 2016/0048343 A1* | 2/2016 | Pekny | ...................... | G11C 7/22 711/103 |
| 2017/0060422 A1* | 3/2017 | Sharifie | .................... | G06F 3/061 |
| 2018/0024779 A1* | 1/2018 | Kojima | ............... | G06F 12/0246 711/103 |

FOREIGN PATENT DOCUMENTS

KR 101792870 11/2017

* cited by examiner

*Primary Examiner* — Edward J Dudek, Jr.
(74) *Attorney, Agent, or Firm* — IP & T Group LLP (57) ABSTRACT

A data storage apparatus includes a storage configured to include a storage configured to include at least one die including a plurality of planes, wherein each of the plurality of planes contains a set of a plurality of memory blocks, each including a plurality of pages configured of a plurality of memory cells; and a controller configured to: control data input to and output from the storage according to a request received from a host apparatus, receive a plurality of read requests including respective access addresses and access sizes from the host apparatus, generate one or more paired read requests from among the plurality of read requests so that a region to be accessed in one read operation is minimized, and determine a read option for each of the paired read requests.

24 Claims, 7 Drawing Sheets

DATA STORAGE APPARATUS, OPERATING METHOD THEREOF, AND STORAGE SYSTEM HAVING THE SAME

CROSS-REFERENCE TO RELATED APPLICATION

The present application claims priority under 35 U.S.C. § 119(a) to Korean application number 10-2018-0098485, filed on Aug. 23, 2018, in the Korean Intellectual Property Office, which is incorporated herein by reference in its entirety.

BACKGROUND

1. Technical Field

Various embodiments may generally relate to a semiconductor integrated apparatus, and more particularly, to a data storage apparatus, an operating method thereof, and a storage system having the same.

2. Related Art

Any of various apparatuses may be coupled to a host apparatus and perform a data input/output operation according to a request of the host apparatus. The storage apparatuses may employ various storage media to store data.

The storage apparatuses may include apparatuses configured to store data in magnetic discs such as a hard disc drive (HDD) and apparatuses configured to store data in semiconductor memory devices (particularly, nonvolatile memory devices) such as a solid state drive (SDD) or a memory card.

Storage media employing flash memories have the advantages of large capacity, non-volatility, low cost, low power consumption, and high data processing rate.

The performance of the storage media may depend on high data storage capability and high data processing rate.

SUMMARY

In an embodiment of the present disclosure, a data storage apparatus may include: a storage configured to include at least one die including a plurality of planes, wherein each of the plurality of planes contains a set of a plurality of memory blocks, each including a plurality of pages configured of a plurality of memory cells; and a controller configured to: control data input to and output from the storage according to a request received from a host apparatus, receive a plurality of read requests including respective access addresses and access sizes from the host apparatus, generate one or more paired read requests from among the plurality of read requests so that a region to be accessed in one read operation is minimized, and determine a read option for each of the paired read requests.

In an embodiment of the present disclosure, a data storage apparatus may include: a storage including a plurality of planes; and a controller configured to: simultaneously read out data from a plurality of pages in the plurality of planes in response to a read request, wherein the read request includes an access address and an access size, and generate one or more paired read requests from among a plurality of read requests so that a size of a region to be accessed in one read operation is minimized, wherein, for each paired read request, a read option is determined from among a first read option, a second read option, and a third read option based on the size of the region to be accessed in the one read operation.

In another embodiment of the present disclosure, an operating method of a data storage apparatus which includes a storage configured to include a plurality of planes and a controller configured to control data input/output to/from the storage according to a request transmitted from a host apparatus, the method may include: receiving a plurality of read requests including respective access addresses and access sizes from the host apparatus; generating one or more paired read requests by pairing the plurality of read requests so that a region to be accessed in one read operation is minimized; and determining a read option for each of the paired read requests.

In an embodiment of the present disclosure, a storage system may include: a host apparatus; and a data storage apparatus which includes: a storage configured to include a plurality of planes, and a controller configured to control data exchanged with the storage according to a request transmitted from the host apparatus, wherein the controller is configured to: receive a plurality of read requests respectively including access addresses and access sizes from the host apparatus, generate one or more paired read requests from among the plurality of read requests so that a region to be accessed in one read operation is minimized, and determine a read option for each of the paired read requests.

In another embodiment of the present disclosure, an operating method may include: pairing requests, which have respective access sizes within one among a plurality of access size ranges and are for different planes within a single die, among a plurality of read requests; and controlling, according to the paired requests, a memory device to simultaneously read data from the different planes, wherein, for each paired read request, data is read according to a greater of the a plurality of access sizes.

These and other features, aspects, and embodiments are described below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to illustrations of embodiments of the present invention. However, neither the disclosed embodiments of the present invention nor the specifics of the drawings should be construed as limiting the inventive concept. Although a few embodiments of the present invention are shown and described, it will be appreciated by those of ordinary skill in the art that changes may be made in these embodiments without departing from the principles and spirit of the present invention. Throughout the specification, reference to "an embodiment," "another embodiment" or the like is not necessarily to only one embodiment, and different references to any such phrase are not necessarily to the same embodiment(s).

Figure 1:
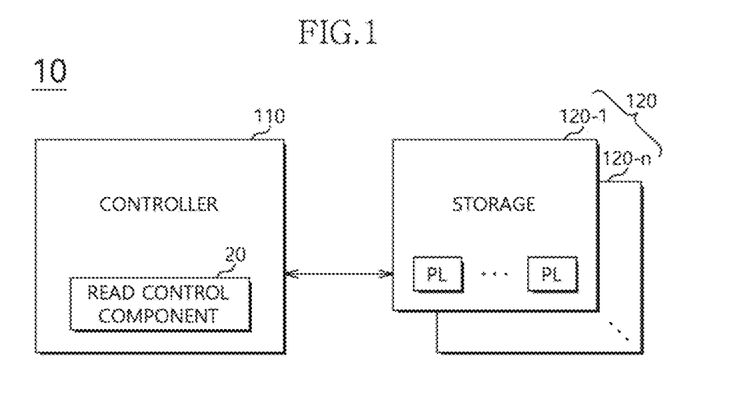
FIG. 1 is a block diagram illustrating a configuration of a data storage apparatus in accordance with an embodiment of the present disclosure.

FIG. 1 is a block diagram illustrating a configuration of a data storage apparatus 10 in accordance with an embodiment.

Referring to FIG. 1, the data storage apparatus 10 may include a controller 110 and a storage 120.

The controller 110 may control the storage 120 in response to a request of a host apparatus (not shown). For example, the controller 110 may allow data to be programmed in the storage 120 according to a program (write) request of the host apparatus. Further, the controller 110 may provide data written in the storage 120 to the host apparatus in response to a read request of the host apparatus. In an embodiment, the controller 110 may store commands or requests transmitted from the host apparatus in a queue and process the commands or requests according to a scheduling result of the commands or requests.

The storage 120 may include a plurality of dies 120-1 to 120-n and store data or output data stored therein according to control of the controller 110. The storage 120 may be configured of a volatile memory device or a nonvolatile memory device. In an embodiment, the storage 120 may be implemented using a memory device selected from various nonvolatile memory devices such as an electrically erasable and programmable read only memory (EEPROM), a NAND flash memory, a NOR flash memory, a phase-change random access memory (PRAM), a resistive RAM (ReRAM), a ferroelectric RAM (FRAM), and a spin torque transfer magnetic RAM (STT-RAM). The storage 120 may include at least one die 120-1 to 120-n. Each of the dies 120-1 to 120-n may include a plurality of planes PL. Each of the planes PL may include at least one or more memory blocks and each of the memory blocks may have a hierarchy structure including at least one or more pages including a plurality of memory cells. For example, read and write (program) operations may be performed in page units and an erase operation may be performed in block units. The processing units of data to be read or written may be determined according to a manufacturing purpose and the like of the data storage apparatus 10 to improve a data input/output (I/O) rate. Further, the storage 120 may be configured of at least one of a single level cell (SLC) in which a single bit data (for example, 1-bit data) is to be stored in one memory cell and a multilevel cell (MLC) in which 2-bit or more data is to be stored in one memory cell.

The controller 110 may control the storage 120 to operate according to a plane interleaving operation or scheme. According to the plane interleaving scheme, operations (for example, reading or writing) to be performed for requests from the host apparatus may be distributed among different planes within a single die to be performed simultaneously. In an embodiment, the controller 110 may control the storage 120 to perform an access operation according to a synchronous or simultaneous plane interleaving method or scheme such that data having the same size are processed by simultaneously accessing pages having the same offset, or pages having different offsets within memory blocks selected from idle planes in the same die. According to the synchronous plane interleaving scheme, the storage 120 may receive a pair of requests (e.g., commands) at the same time to access a plurality of planes which are in an idle state or a standby state, or in another aspect, not in a busy state, and to collectively and simultaneously process data, which are provided along with the pair of commands and have the same size. The pairing of requests is described with reference to FIG. 6.

The controller 110 may include a read control component 20. To process data according to the synchronous plane interleaving scheme, the read control component 20 may pair read requests of the host apparatus by receiving the read requests including addresses of regions to be accessed and sizes of the regions to be accessed within the storage 120 from the host apparatus. In an embodiment, the read control component 20 may pair the read requests based on the sizes included in the read requests of the host apparatus. Further, the read control component 20 may determine read options for the paired read requests.

In an embodiment, the read options may be divided into, according to a size of a region to be accessed in one read operation, a first read option FULL in which a size to be accessed has the largest value, a second read option HALF in which the size to be accessed has a middle value, and a third read option QUARTER in which the size to be accessed has the smallest value. Accordingly, the larger the size of the region to be accessed is, the higher the read option is.

The first read option may be an operation mode which reads data with an access size set as a default value through the controller 110. The second and third read options may be operation modes which read data with access sizes corresponding to a half of the default value and a quarter of the default value.

The read control component 20 may pair the read requests having the same read option as each other with respect to different planes. Alternatively, the read control component 20 may pair the read requests having different read options from each other with respect to different planes. When the read requests having the different read options are paired, the read control component 20 may pair the read requests so that the size of the region to be accessed is minimized and perform the read operations based on the higher read option of the paired read requests.

In another aspect, the read control component 20 may pair the read requests so that the size of the region to be accessed is minimized and determine the read option based on the maximum access size of the access sizes of the read requests paired in one set.

Figure 2:
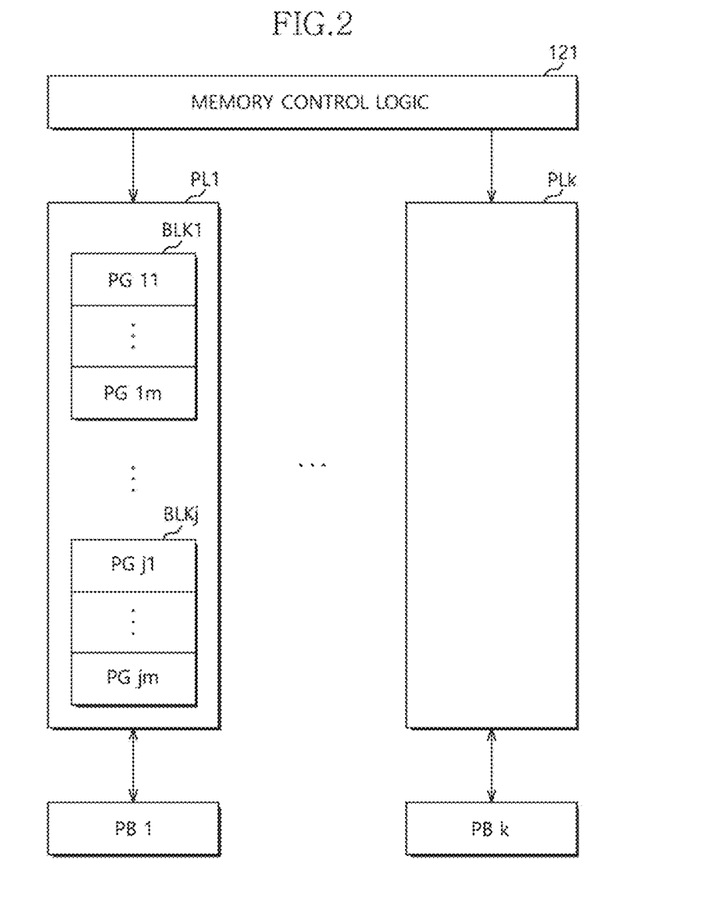
FIG. 2 is a diagram illustrating a configuration of a storage in accordance with an embodiment of the present disclosure.

FIG. 2 is a configuration diagram illustrating the storage 120 in accordance with an embodiment.

Referring to FIG. 2, the storage 120 in accordance with an embodiment may include memory control logic 121, a plurality of planes PL1 to PLk, and a plurality of page buffers PB1 to PBk. Each of the planes PL1 to PLk may include a plurality of blocks BLK1 to BLKj. Each of the blocks BLK1 to BLKj may include a plurality of pages PGx1 to PGxm.

The page buffers PB1 to PBk may correspond to the planes PL1 to PLk. Each of the page buffers PB1 to PBk may be shared by the plurality of memory blocks BLK1 to BLKj included in a corresponding plane of the planes PL1 to PLk. For example, the page buffer PB1 may be shared by the memory blocks BLK1 to BLKj included in the corresponding plane PL1 and may temporarily store data transmitted between the controller 110 and the memory blocks BLK1 to BLKj.

The memory control logic 121 may perform a data read operation or a data write operation in response to a request provided from the controller 110. In the data read operation, the memory control logic 121 may output data of a corresponding memory region to the outside of the storage 120 through the page buffer PBx in response to the read request provided from the controller 110. In the data write operation, the memory control logic 121 may temporarily store write data in the page buffer PBx in the response to the write request provided from the controller 110 and then may transfer and store the data of the page buffer PBx to and in the corresponding memory region.

To perform the read operation or the write operation in the plane interleaving scheme, the memory control logic 121 may, through control of the controller 110, simultaneously select a plurality of target planes, which are designated through the host apparatus and address-converted through the controller 110, and access particular locations (for example, target pages) of the selected target planes. During the read or write operation in the synchronous plane interleaving scheme, the memory control logic 121 may, through control of the controller 110, simultaneously select the plurality of planes which are in an idle state and simultaneously read or write data having the same size by accessing the target pages within the target memory blocks of the selected target planes.

The memory blocks BLK1 to BLKj may have substantially the same configuration as each other. As an example, the memory block BLK1 may include a plurality of pages PG11 to PG1m.

The pages PGx1 to PGxm may be the memory units for performing the read or write operation in each of the planes PL1 to PLk. When the read operation is performed, the controller 110 may select one or more target planes among the planes PL1 to PLk and read out data stored in the target pages of the selected target planes. The storage 120 may simultaneously read out data from the target pages of the memory blocks within two or target planes through the multiplane read operation. The data read out from the target pages may be output from the storage 120 through the corresponding page buffers to an external device.

Each of the memory blocks BLK1 to BLKj may include pages each having set or predetermined offsets. For example, when "m" pages are included in each of the memory blocks, each of the memory blocks BLK1 to BLKj may include pages corresponding to the offsets of from "1" to "m". Accordingly, the offsets of the pages may be addresses of the pages. The offsets may define locations of the pages in the memory block. The pages having the same offset in different memory blocks may have the same locations of the corresponding memory blocks. The pages having the same offset in the different memory blocks may be coupled to the same-ordered word lines in the corresponding memory blocks.

Accordingly, the controller 110 may specify and access the target page by designating a plane address, a memory block address, and an offset.

Figure 3:
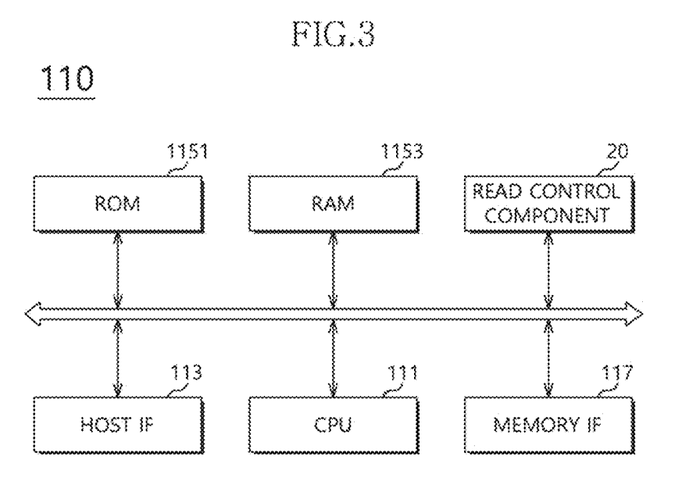
FIG. 3 is a diagram illustrating a configuration of a controller in accordance with an embodiment of the present disclosure.

FIG. 3 is a diagram illustrating a configuration of a controller in accordance with an embodiment.

Referring to FIG. 3, the controller 110 in accordance with an embodiment may include a central processing unit (CPU) 111, a host interface 113, a ROM 1151, a RAM 1153, a memory interface 117, and the read control component 20.

The CPU 111 may be configured to transfer various control information required for the data read or write operation with respect to the storage 120 to the host interface 113, the RAM 1151, and the memory interface 117. In an embodiment, the CPU 111 may be operated according to firmware provided for the various operations of the data storage apparatus 10. In an embodiment, the CPU 111 may perform functions of a flash translation layer (FTL) such as garbage collection, address mapping, wear leveling, and the like, which manage the storage 120, a function of detecting and correcting errors of data read out from the storage 120, and the like.

The host interface 113 may, through control of the CPU 111, receive a command and a clock signal from a host apparatus and provide a communication channel for controlling data input/output. In particular, the host interface 113 may provide a physical connection between the host apparatus and the data storage apparatus 10. The host interface 113 may provide interfacing with the data storage apparatus 10 in response to a bus format of the host apparatus. The bus format of the host apparatus may include at least one of standard interface protocols such as secure digital, universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-E), and universal flash storage (UFS).

The ROM 1151 may store program codes, for example, firmware or software required for an operation of the controller 110 and store code data and the like which are used by the program codes.

The RAM 1153 may store data required for an operation of the controller 110 or data generated through the controller 110.

The memory interface 117 may provide a communication channel for exchanging signals between the controller 110 and the storage 120. The memory interface 117 may write data temporarily stored in a buffer memory in the storage 120 according to control of the CPU 111. The memory interface 117 may transfer and temporarily store data read out from the storage 120 to and in the buffer memory.

To process data according to the synchronous plane interleaving scheme, the read control component 20 may store the read requests including the addresses and sizes to be accessed within the storage 120 by receiving the read requests from the host apparatus and pair the read requests of the host apparatus. In an embodiment, the read control component 20 may pair the read requests based on the sizes included in the read requests of the host apparatus so that a minimum region is to be accessed. Further, the read control component 20 may determine one among the first to third read options for the paired read requests. In an embodiment, the read control component 20 may determine the read option based on the maximum access size of the paired read request.

In an embodiment, the read control component 20 may pair two among the plurality of read requests from the host apparatus and determine the read option based on the sizes of the paired read requests. As described above, the read options may be divided into, according to the size of the page to be simultaneously accessed, a first read option FULL having an access size corresponding to a default value, a second read option HALF for accessing a region corresponding to a half of the default value, and a third read option QUARTER for accessing a region corresponding to a quarter of the default value. The read control component 20 may pair the read requests and determine one among the first to third read options according to the access sizes of the read requests included in the paired read requests so that both the region to be accessed and the read latency are minimized.

For example, the read control component 20 may pair the read requests based on the access sizes included in the read requests of the host apparatus. The read control component 20 may determine the read option based on the maximum access size of the access sizes of the read requests paired in one set.

Figure 4:
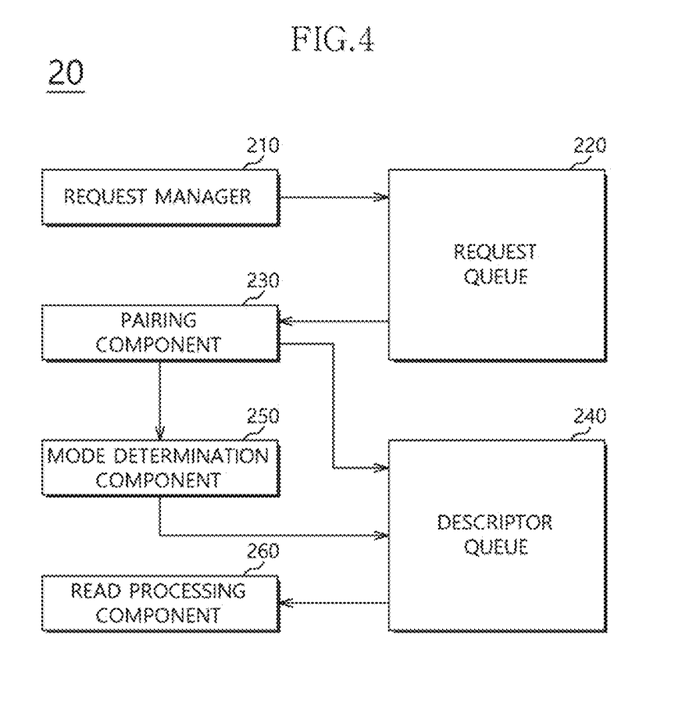
FIG. 4 is a diagram illustrating a configuration of a read control component in accordance with an embodiment of the present disclosure.

FIG. 4 is a configuration diagram illustrating the read control component 20 in accordance with an embodiment.

Referring to FIG. 4, the read control component 20 may include a request manager 210, a request queue 220, a paring component 230, a descriptor queue 240, a mode determination component 250, and a read processing component 260.

The request manager 210 may store the read requests received from the host apparatus in the request queue 220 in the order in which they are input. The read request of the host apparatus may include a logical address and an access size. The logical address included in the read request of the host apparatus may be converted into a physical address through the controller 110 and the physical address may be provided to the request manager 210. In an embodiment, the physical address may include a plane address, a block address, and an offset of a page. The request manager 210 may delete the process-completed request from the request queue 220.

The paring component 230 may search the read requests included in the request queue 220 according to an operation state of the storage 120 and pair the read requests for the different planes in the same die. In an embodiment, the paring component 230 may store the paired read requests in the descriptor queue 240.

In an embodiment, the paring component 230 may pair the read requests based on the access sizes included in the read requests of the host apparatus. The pairing of the requests will be described later with reference to FIG. 6.

The access size included in the read request of the host apparatus may fall in any one of the following three cases:

Case 1: the access size is smaller than a quarter of an access size set to the default value (i.e., smaller than the value of the third read option QUARTER);

Case 2: the access size is larger than a quarter of the access size set to the default value and smaller than a half of the access size set to the default value (i.e., between the value of the access size of the third read option QUARTER and the value of the access size of the second read option HALF); and Case 3: the access size is larger than a half of the access size set to the default value (i.e., larger than the value of the access size of the second read option HALF).

Accordingly, the target requests to be paired and the read option thereof may be determined according to the three cases.

The paring component 230 may identify the read options of the read requests according to the access sizes of the read requests queued in the request queue 220 and pair the read requests having the same read option.

When the queued read requests do not have the same read option, the paring component 230 may pair the read requests, which do not have the same read option, such that the access region for the paired read requests is minimized, thereby preventing an unnecessary read operation.

For example, a read operation for a read request in Case 1 may be performed with the third read option, a read operation for a read request in Case 2 may be performed with the second read option, and a read operation for a read request in Case 3 may be performed with the first read option. Therefore, it is more advantageous in terms of read latency to perform the read operation with the second read option by pairing the read request in Case 1 and the read request in Case 2 than to perform the read operation with the first read option by pairing the read request in Case 1 and the read request in Case 3.

Accordingly, when the queued read requests do not have the same read option, the paring component 230 may pair the read requests so that the region to be accessed is minimized.

The mode determination component 250 may determine the higher read option of the paired read requests and store the determined read option in the descriptor queue 240 for the paired read requests.

The read processing component 260 may control the memory control logic 121 to perform the read operations by transferring the paired read requests and the correspondingly determined read option (i.e., the higher read option of the paired read requests) to the memory control logic 121 of the storage 120 by referring to the descriptor queue 240. Accordingly, the memory control logic 121 may sequentially perform the paired read requests stored in the descriptor queue 430 according to their respective read options.

In an embodiment, when all the planes to be operated in the synchronous plane interleaving scheme are in an idle state, the paired read requests may be sequentially input to the storage 120 and the read operations may be simultaneously performed in the plurality of planes in parallel.

Figure 5A:
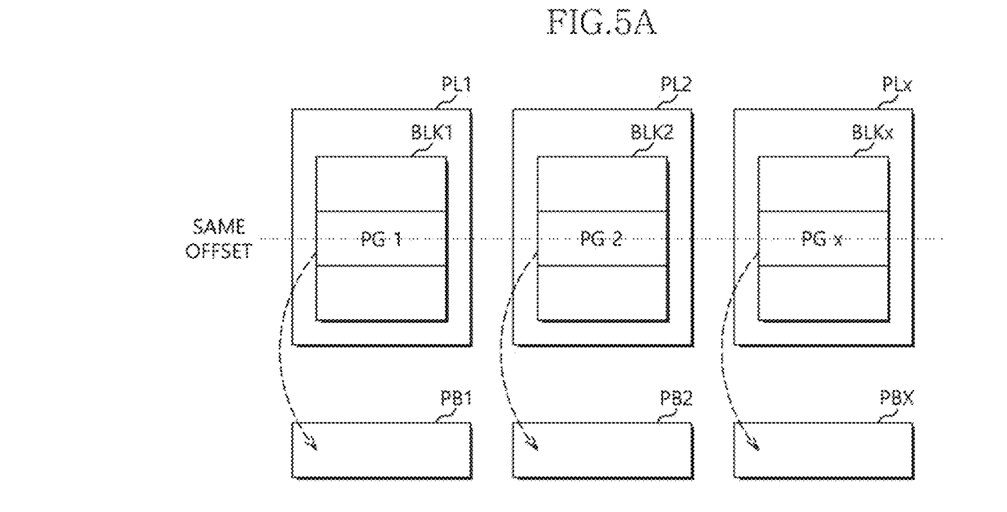
FIGS. 5A and 5B are diagrams explaining a plane interleaving operation in accordance with an embodiment of the present disclosure.
Figure 5B:
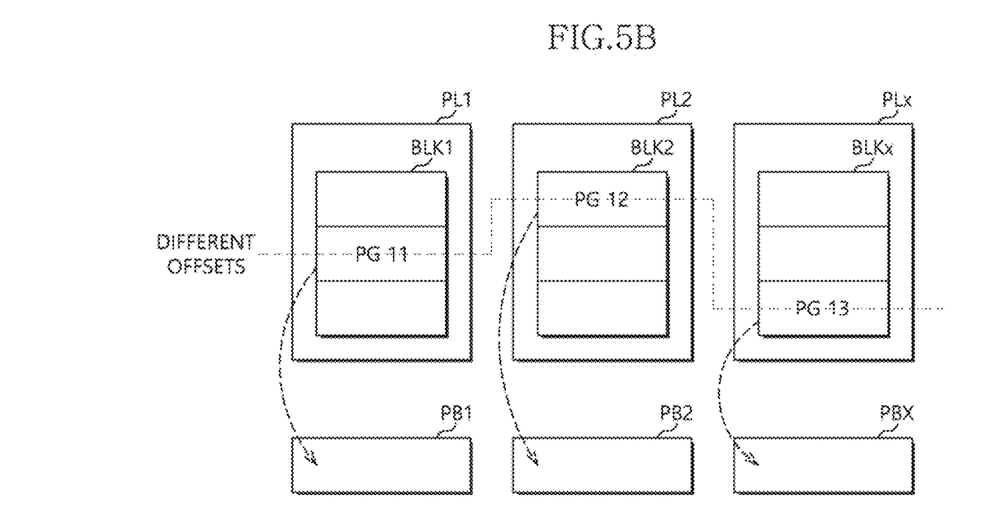

FIGS. 5A and 5B are diagrams explaining an interleaving operation in accordance with an embodiment.

Referring to FIG. 5A, the data storage apparatus 10 may simultaneously perform the read operations with respect to "x" number of target planes PL1 to PLx.

The target planes PL1 to PLx may include target memory blocks BLK1 to BLKx including target pages PG1 to PGx of the read operations. For example, the respective memory blocks BLK1 to BLKx for the respective target planes PL1 to PLx may be selected as target blocks and the pages PG1 to PGx having specific offsets may be selected as target pages from the respective memory blocks BLK1 to BLKx. A number of pages corresponding to the access size in the request of the host apparatus may be simultaneously accessed starting from the target pages PG1 to PGx. For example, in the read operation, the data stored in the pages corresponding to the access size for the paired requests, starting from the target pages PG1 to PGx, may be simultaneously read out and may be stored in the page buffers PB1, PB2, and PBx.

In the plane interleaving scheme illustrated in FIG. 5A, the start pages PG1 to PGx may have the same offset and may be located in the same locations in their respective target memory blocks BLK1 to BLKx. The pages PG1 to PGx, having the same offset, may be coupled to the same-ordered word lines in their respective target memory blocks BLK1 to BLKx.

FIG. 5B is a diagram illustrating another example of the plane interleaving scheme in accordance with an embodiment.

Referring to FIG. 5B, differently from the plane interleaving scheme illustrated in FIG. 5A, target pages PG11 to PG13 of their target planes PL1 to PLx may have different offsets from each other. The target pages PG11 to PG13, having different offsets, may be located in different locations within their target memory blocks BLK1 to BLKx. The data storage apparatus 10 may simultaneously access the target pages PG11 to PG1x of their target planes PL1 to PLx which are in an idle state. For example, in the read operation, the data stored in the target pages PG11 to PG1x may be simultaneously read and output to from the page buffers PB1, PB2, and PBx to an external device.

Figure 6:
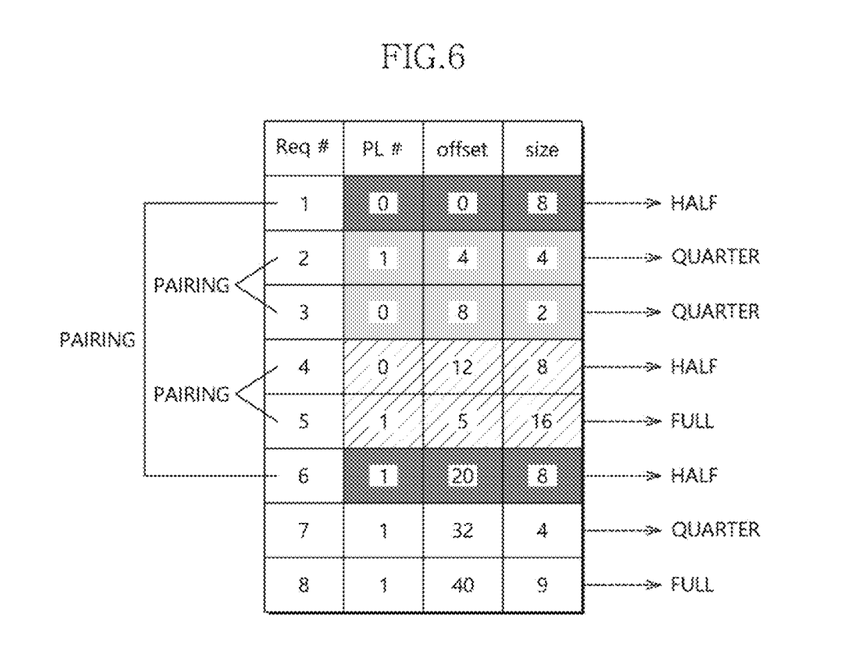
FIG. 6 is a diagram explaining a request pairing method in accordance with an embodiment of the present disclosure.

FIG. 6 is a diagram illustrating a request pairing method in accordance with an embodiment.

The request manager 210 may sequentially store the requests from the host apparatus in the request queue 220. In the example of FIG. 6, eight read requests are stored in the request queue 220.

When planes PL0 and PL1 to be simultaneously operated are in a busy state, the read control component 20 may pair the read requests and determine the read options for the paired read requests. Then the read control component 20 may queue the paired read requests and their respective read options in the descriptor queue 240. When the planes PL0 and PL1 to be simultaneously operated transition from the busy state to the idle state or the standby state, the paired read requests queued in the descriptor queue 240 may be sequentially processed according to the read options.

Referring to FIG. 6, the first read request (Req #1) may be a request for performing the read operation by accessing the target block of the plane PL0 (PL #0) by the access size (size 8) starting with a start page (offset 0). In an embodiment, the access size of the first read option may be 16 Kbyte and in this case, the read option of the first read request may be in the second read option HALF.

A read request to be paired with the first read request is preferably a read request for another plane, for example, the plane PL1. Since the sixth read request having the same read option as the first read request, among the second, fifth, sixth, seventh and eighth read requests (Req #2, 5, 6, 7 and 8) for the plane PL1, is present, the first read request and the sixth read request may be paired and processed with the second read option HALF.

Similarly, a read request to be paired with the second read request may be one of the third and fourth read requests for the plane PL0. Of those two, the third read request has the same read option as the second read request, and thus may be paired with the second read request. Then, the paired second and third read requests may be processed with the third read option QUARTER.

On the other hand, a read request to be paired with the fourth read request may be one among the fifth, seventh and eights read requests for the plane PL1. The fourth read request may be processed with the second read option HALF, and since no read request having the same read option as the second read option HALF among the fifth, seventh and eighth read options is present, any one of the fifth and eighth read requests having a higher read option than the second read option HALF, for example, the fifth read request corresponding to the first read option FULL, may be paired with the fourth read request. Then, the paired fourth and fifth read requests may be processed with the first read option FULL.

When the read operation is performed according to the access size corresponding to the default value with respect to the read request having an access size smaller than the default value, the read latency may be degraded. In the present disclosure, the read speed may be improved by pairing the read requests to access the minimum region and performing the read operation with the read option which can satisfy both the paired read requests.

Figure 7:
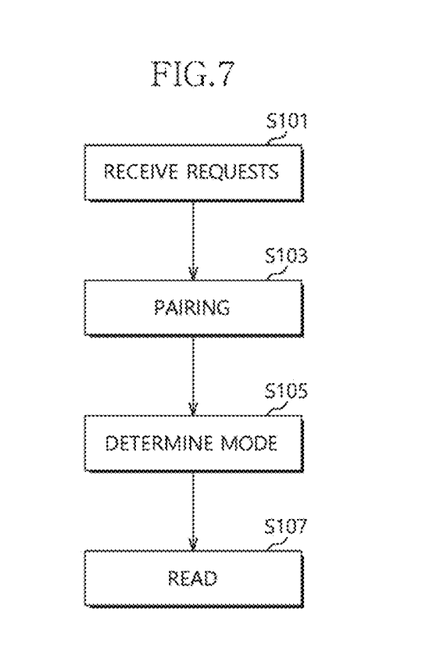
FIG. 7 is a flowchart illustrating an operation method of a data storage apparatus in accordance with an embodiment of the present disclosure.

FIG. 7 is a flowchart illustrating an operation method of a data storage apparatus in accordance with an embodiment.

Referring to FIG. 7, as the read requests are provided from the host apparatus, the controller 110 may store the read requests in the request queue 220 (S101).

The read request of the host apparatus may include a logical address and an access size. The logical address included in the read request of the host apparatus may be converted into a physical address through the controller 110 and the physical address may include a plane address, a block address, and an offset.

The controller 110 may search the read requests in the request queue 220 and pair the read requests for different plane addresses of the same die to generate one or more paired read requests (S103). In an embodiment, the controller 110 may store the paired read requests in the descriptor queue 240.

In an embodiment, the controller 110 may pair the read requests based on the access sizes in the read requests of the host apparatus. For example, the controller 110 may divide the read options of the read requests according to the access sizes of the queued read requests and pair the read requests having the same read option. When no read requests having the same read option are present, the controller 110 may pair read requests, which do not have the same read option, such that the entire access region for the paired read requests is minimized, thereby preventing an unnecessary read operation.

In another aspect, when no read requests for performing the read operations with the same read option are present, the controller 110 may pair the read requests so that the region to be accessed is minimized.

The controller 110 may determine, for each of the paired read requests, the higher of the two read options of the paired read requests as a final read option and store the final read option in the descriptor queue 240 matched to that paired read request (S105).

The controller 110 may control the storage 120 to perform the read operations by transferring the paired read requests and their respective read options to the storage 120 by referring to the descriptor queue 240. Accordingly, the memory control logic 121 may sequentially perform each of the paired read requests stored in the descriptor queue 240 in accordance with the final read option determined for that pair (S107).

In an embodiment, when all the planes to be operated in the synchronous plane interleaving scheme are in an idle state, the paired read requests may be input to the storage 120 and the read operations may be simultaneously performed in a plurality of planes in parallel.

Figure 8:
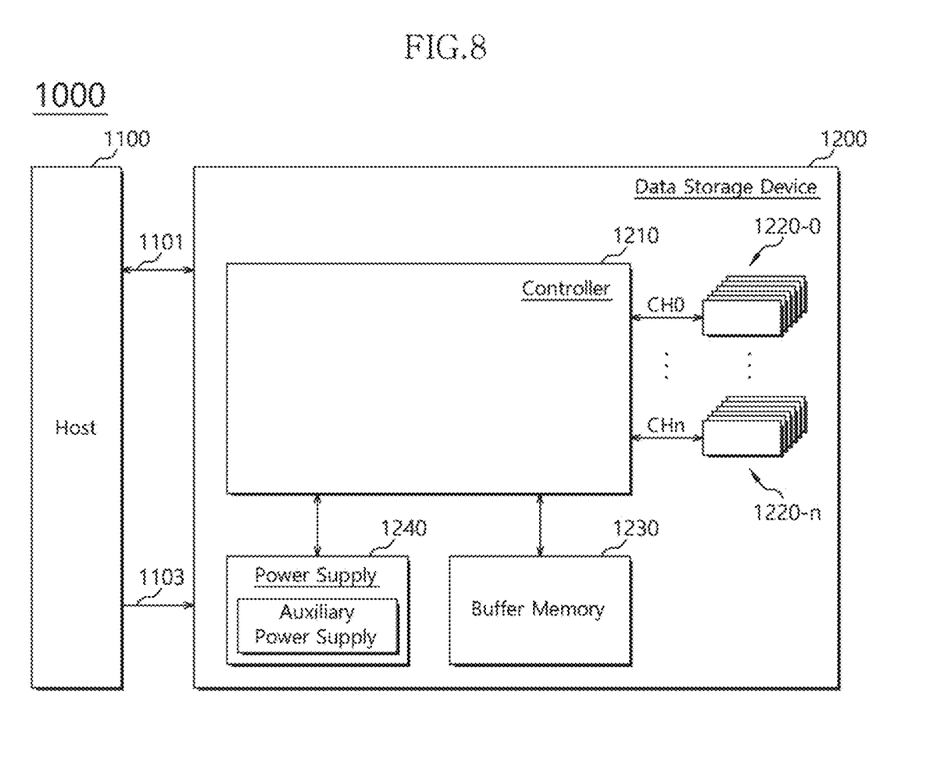
FIG. 8 is a diagram illustrating a data storage system in accordance with an embodiment of the present disclosure.

FIG. 8 is a diagram illustrating a data storage system in accordance with an embodiment.

Referring to FIG. 8, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to **1220-*n*, a buffer memory device 1230, a power supply 1240, a signal connector 1101, and a power connector 1103**.

The controller 1210 may control general operations of the data storage device 1200. The controller 1210 may include a host interface, a control component, a random access memory used as a working memory, an error correction code (ECC) component, and a memory interface. In an embodiment, the controller 1210 may configured by controller 110 comprising read control component 20 as shown is FIG. 1 to FIG. 4.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to **1220-*n*. Further, the buffer memory device 1230 may temporarily store the data read from at least one of the nonvolatile memory devices 1220-0 to 1220-*n*. The data temporarily stored in the buffer memory device 1230 may be transmitted to the host device 1100 or at least one of the nonvolatile memory devices 1220-0 to 1220-*n* according to control of the controller 1210**.

The nonvolatile memory devices 1220-0 to **1220-*n* may be used as storage media of the data storage device 1200. The nonvolatile memory devices 1220-0 to 1220-*n* may be coupled with the controller 1210** through a plurality of channels CH1 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103, to components within the data storage device 1200. The power supply 1240 may include an auxiliary power supply. The auxiliary power supply may supply power to allow the data storage device 1200 to be properly terminated when a sudden power-off occurs. The auxiliary power supply may include large capacity capacitors.

The signal connector 1101 may be configured as any of various types of connectors depending on an interface scheme between the host device 1100 and the data storage device 1200.

The power connector 1103 may be configured as any of various types of connectors depending on a power supply scheme of the host device 1100.

Figure 9:
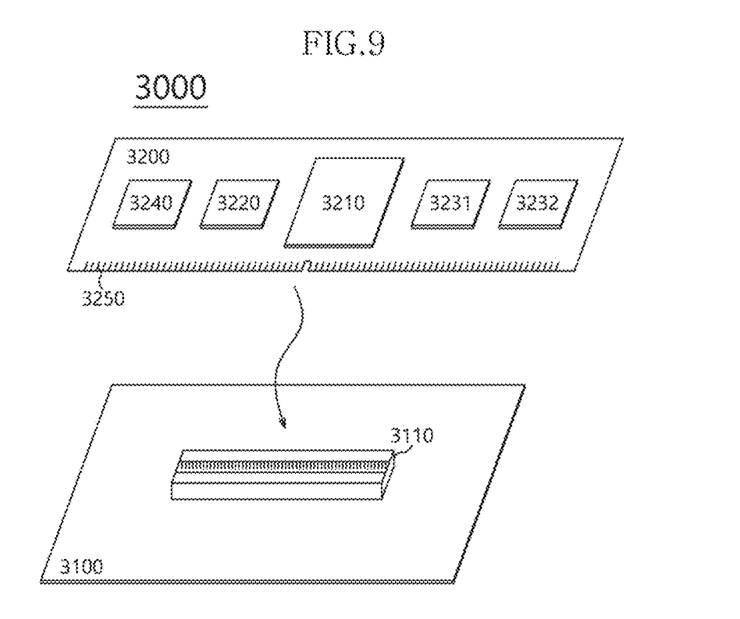
FIG. 9 and FIG. 10 are diagrams illustrating a data processing system in accordance with embodiments of the present disclosure.

FIG. 9 is a diagram illustrating a data processing system in accordance with an embodiment. Referring to FIG. 9, the data processing system 3000 may include a host device 3100 and the memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 comprising the read control component 20 as shown in FIGS. 1 to 4.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to components within the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and the like, as well as power, may be transferred between the host device 3100 and the memory system 3200. The connection terminal 3250 may be configured into various types depending on an interface scheme between the host device 3100 and the memory system 3200. The connection terminal 3250 may be disposed on or in any side of the memory system 3200.

Figure 10:
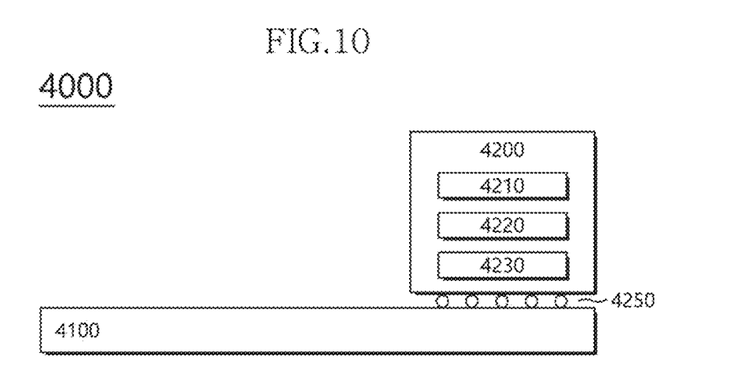

FIG. 10 is a diagram illustrating a data processing system in accordance with an embodiment. Referring to FIG. 10, the data processing system 4000 may include a host device 4100 and the memory system 4200.

The host device 4100 may be configured in the form of a board such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 comprising the read control component 20 as shown in FIGS. 1 to 4.

The buffer memory device 4220 may temporarily store data to be stored in the nonvolatile memory device 4230. Further, the buffer memory device 4220 may temporarily store the data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 11:
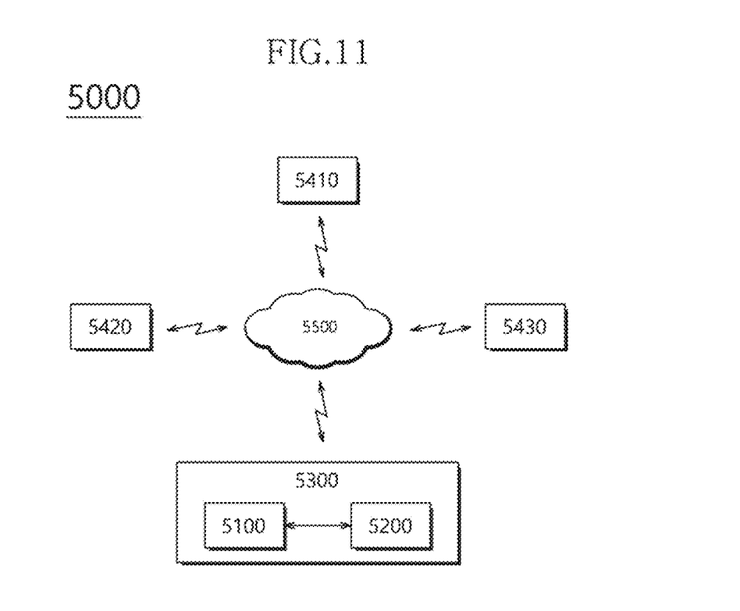
FIG. 11 is a diagram illustrating a network system including a data storage device in accordance with an embodiment of the present disclosure.

FIG. 11 is a diagram illustrating a network system including a data storage device in accordance with an embodiment. Referring to FIG. 11, the network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and the memory system 5200. The memory system 5200 may be configured as the memory system 10 shown in FIG. 1, the data storage device 1200 shown in FIG. 8, the memory system 3200 shown in FIG. 9 or the memory system 4200 shown in FIG. 10.

Figure 12:
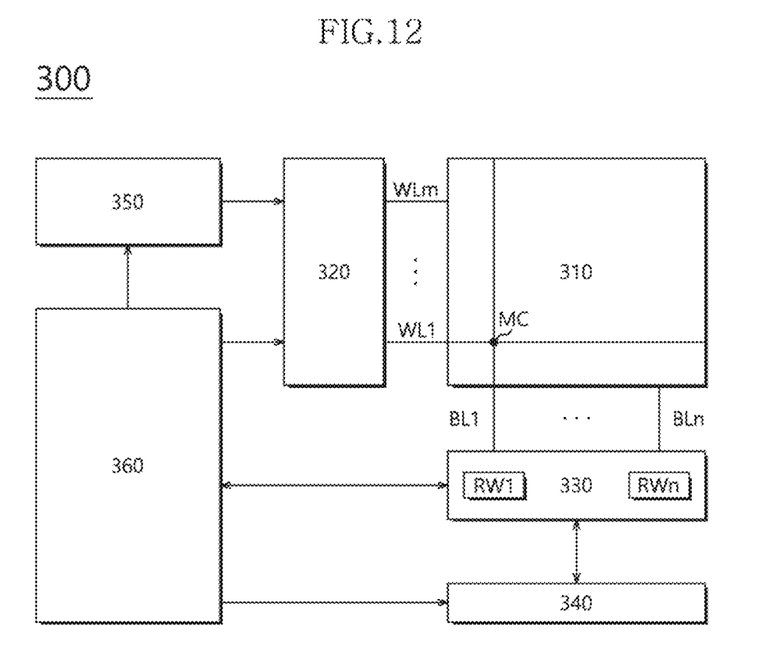
FIG. 12 is a block diagram illustrating a nonvolatile memory device included in a data storage device in accordance with an embodiment of the present disclosure.

FIG. 12 is a block diagram illustrating a nonvolatile memory device included in a data storage device in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array, which extends perpendicular to the flat surface of a semiconductor substrate. Moreover, the three-dimensional memory array means a structure including NAND strings in which memory cells are in a stacked arrangement.

However, the structure of the three-dimensional memory array is not limited to the above-described arrangement. Rather, the memory array structure may be formed in a highly integrated manner with horizontal directionality as well as vertical directionality.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been illustrated and described, it will be understood to those skilled in the art that the embodiments described are examples only. Accordingly, the data storage device, the operating method thereof and the storage system including the same described herein should not be limited based on the described embodiments.

The above described embodiments of the present invention are intended to illustrate, not to limit the present invention. Various alternatives and equivalents are possible, as those skilled in the art will recognize in light of the present disclosure. The invention is not limited by the embodiments described herein. Nor is the invention limited to any specific type of semiconductor device. The present invention includes any and all additions, subtractions, or modifications that fall within the scope of the appended claims.

What is claimed is:

1. A data storage apparatus comprising:
    a storage configured to include at least one die including a plurality of planes, wherein each of the plurality of planes contains a set of a plurality of memory blocks, each including a plurality of pages configured of a plurality of memory cells; and
    a controller configured to:
    control data input to and output from the storage according to a request received from a host apparatus,
    receive a plurality of read requests including respective access addresses and access sizes from the host apparatus,
    generate one or more paired read requests from among the plurality of read requests so that a region to be accessed in one read operation is minimized, and determine a read option for each of the paired read requests,
wherein the read option is determined from among a first read option, a second read option, and a third read option according to a size of the region to be accessed in the one read operation.

2. The data storage apparatus of claim 1, wherein the controller is configured to determine, with respect to each of the paired read requests, a read option corresponding to the read request having the larger access size of the pair of read requests as the read option of the paired read request.

3. The data storage apparatus of claim 1, wherein the controller is configured to generate the one or more paired read requests by pairing read requests having the same read option with respect to different planes.

4. The data storage apparatus of claim 1, wherein the access size of the paired read request is determined according to a maximum value of the access sizes of the read requests in the paired read request.

5. The data storage apparatus of claim 4, wherein the controller is configured to pair read requests having different read options with respect to different planes so that the access size of the paired read request is minimized and determine the read option based on the maximum access size of the access sizes of the read requests in the paired read request.

6. The data storage apparatus of claim 1, wherein the read option is determined from among the first read option for performing a read operation on a region corresponding to an access size set to a default value, the second read option for performing a read operation on a region corresponding to a half of the default value, and the third read option for performing a read operation on a region corresponding to a quarter of the default value.

7. The data storage apparatus of claim 1, wherein the controller is configured to provide the paired read requests to the storage when all planes to be simultaneously operated are in an idle state.

8. The data storage apparatus of claim 1, wherein the controller is configured to input or output data having the same size by simultaneously accessing pages having the same offset or pages having different offsets from each other with respect to memory blocks selected from a plurality of planes which are in idle state.

9. A data storage apparatus comprising:
a storage including a plurality of planes; and
a controller configured to:
simultaneously read out data from a plurality of pages in the plurality of planes in response to a read request, wherein the read request includes an access address and an access size, and
generate one or more paired read requests from among a plurality of read requests so that a size of a region to be accessed in one read operation is minimized, wherein, for each paired read request, a read option is determined from among a first read option, a second read option, and a third read option based on the size of the region to be accessed in the one read operation.

10. The data storage apparatus of claim 9, wherein the controller is configured to determine, with respect to each of the paired read requests, a read option corresponding to the read request of the pair of read requests having the larger access size as the read option of the paired read request.

11. The data storage apparatus of claim 9, wherein the controller is configured further to provide the paired read requests to the storage when all planes to be simultaneously operated are in an idle state.

12. An operating method of a data storage apparatus which includes a storage configured to include a plurality of planes and a controller configured to control data exchanged with the storage according to a request transmitted from a host apparatus, the method comprising:
receiving a plurality of read requests including respective access addresses and access sizes from the host apparatus;
generating one or more paired read requests by pairing the plurality of read requests so that a region to be accessed in one read operation is minimized; and
determining a read option for each of the paired read requests,
wherein the read options are divided into a first read option, a second read option, and a third read option according to a size of the region to be accessed in the one read operation.

13. The method of claim 12,
wherein the determining of the read option includes determining, with respect to each of the paired read requests a read option corresponding to the read request having the larger access size of the pair of read requests as the read option of the paired read request.

14. The method of claim 12, wherein the generating of the one or more paired read requests is carried out by pairing read requests having the same read option with respect to different planes.

15. The method of claim 12, wherein the access size of the paired read request is determined according to a maximum value of the access sizes of the read requests in the paired read request.

16. The method of claim 15,
wherein the generating of the paired read requests includes pairing read requests having different read options with respect to different planes so that the access size of the paired read request is minimized, and the determining of the read option includes determining the read option based on the maximum access size of the access sizes of the read requests in the paired read request.

17. The method of claim 12, wherein the read options include the first read option for performing a read operation on a region corresponding to an access size set to a default value, the second read option for performing a read operation on a region corresponding to a half of the default value, and the third read option for performing a read operation on a region corresponding to a quarter of the default value.

18. The method of claim 12, further comprising providing the paired read requests to the storage when all planes to be simultaneously operated are in an idle state.

19. The method of claim 12, further comprising inputting or outputting data having the same size by simultaneously accessing pages having the same offset or pages having different offsets from each other with respect to memory blocks selected from the plurality of planes which are in an idle state.

20. A storage system comprising:
a host apparatus; and
a data storage apparatus which includes:
a storage configured to include a plurality of planes, and
a controller configured to control data exchanged with the storage according to a request transmitted from the host apparatus, wherein the controller is configured to:

receive a plurality of read requests respectively including access addresses and access sizes from the host apparatus, generate one or more paired read requests from among the plurality of read requests so that a region to be accessed in one read operation is minimized, and determine a read option for each of the paired read requests, wherein the read option is determined from among a first read option, a second read option, and a third read option according to a size of the region to be accessed in the one read operation.

21. The storage system of claim 20, wherein the controller is configured to determine, with respect to each of the paired read requests, a read option corresponding to the read request having the larger access size of the pair of read requests as the read option of the paired read request.

22. The storage system of claim 21, wherein the controller is configured to provide the paired read requests to the storage when all planes to be simultaneously operated are in an idle state.

23. The storage system of claim 21, wherein the controller is configured further to input or output data having the same size by simultaneously accessing pages having the same offset or pages having different offsets from each other with respect to memory blocks selected from a plurality of planes which are in an idle state.

24. An operating method of a memory system, the method comprising:

pairing requests, which have respective access sizes within one among a plurality of access size ranges and are for different planes within a single die, among a plurality of read requests;

controlling, according to the paired requests, a memory device to simultaneously read data from the different planes, wherein, for each paired read request, data is read according to a greater of a plurality of access sizes; and determining a read option for each of the paired requests, wherein the read options are divided into a first read option, a second read option, and a third read option according to a size of a region to be accessed in one read operation.

* * * * *